United States Patent
Kondo et al.

(10) Patent No.: US 9,621,451 B2
(45) Date of Patent: Apr. 11, 2017

(54) ROUTE SELECTION METHOD, NODE DEVICE AND RELAY SYSTEM

(71) Applicant: FUJITSU LIMITED, Kawasaki-shi, Kanagawa (JP)

(72) Inventors: Taiji Kondo, Chiba (JP); Hiroshi Towata, Fukuoka (JP); Eizou Ishizu, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 227 days.

(21) Appl. No.: 14/630,343

(22) Filed: Feb. 24, 2015

(65) Prior Publication Data

US 2015/0271054 A1    Sep. 24, 2015

(30) Foreign Application Priority Data

Mar. 19, 2014 (JP) ................... 2014-057264

(51) Int. Cl.
*H04L 12/26* (2006.01)
*H04L 12/721* (2013.01)
*H04L 12/707* (2013.01)

(52) U.S. Cl.
CPC .......... *H04L 45/124* (2013.01); *H04L 45/123* (2013.01); *H04L 45/22* (2013.01); *H04L 43/0894* (2013.01)

(58) Field of Classification Search
None
See application file for complete search history.

(56) References Cited

U.S. PATENT DOCUMENTS

| | | | |
|---|---|---|---|
| 6,778,502 B2* | 8/2004 | Ricciulli | F25B 41/003 370/238 |
| 7,613,122 B2* | 11/2009 | Nishimura | H04L 12/4625 370/230.1 |
| 2009/0046714 A1* | 2/2009 | Holmer | H04W 40/246 370/389 |
| 2010/0074194 A1 | 3/2010 | Liu et al. | |
| 2010/0195560 A1 | 8/2010 | Nozaki et al. | |
| 2012/0099587 A1 | 4/2012 | Fan et al. | |

(Continued)

FOREIGN PATENT DOCUMENTS

| | | |
|---|---|---|
| JP | 2010-518745 | 5/2010 |
| JP | 2010-178145 | 8/2010 |

(Continued)

*Primary Examiner* — Kenny Lin
(74) *Attorney, Agent, or Firm* — Staas & Halsey LLP

(57) ABSTRACT

Node device calculates reception rate of frames of particular frame type transmitted from adjacent node device, calculates arrival rate of unicast frames on the basis of calculated reception rate and frame length, and calculates inverse number of calculated arrival rate as link cost. Node device obtains from adjacent node device route cost for each route from adjacent node device to each node device that is reachable final destination, calculates route cost of route from node device itself to each node device that is final destination reachable via adjacent node device by integrating calculated link cost and obtained route cost. Node device selects adjacent node device that is transmission destination of data frame on the basis of route cost of route from node device itself to node device that is final destination of data frame when data frame is transmitted.

10 Claims, 15 Drawing Sheets

T3

| GD | ADJACENT NODE DEVICE | LINK COST | ROUTE COST |
|---|---|---|---|
| . . . | . . . | . . . | . . . |
| N1 | N4 | $C_{Link}(N4, N7)$ | $C_{Route}(N1, \cdots, N4, N7)$ |
| | N6 | $C_{Link}(N6, N7)$ | $C_{Route}(N1, \cdots, N6, N7)$ |
| | . . . | . . . | . . . |

(56) References Cited

U.S. PATENT DOCUMENTS

| | | | | |
|---|---|---|---|---|
| 2013/0300633 A1* | 11/2013 | Horio | ............... | G06F 3/1454 345/2.2 |
| 2014/0032711 A1* | 1/2014 | Shimizu | ............... | H04W 40/08 709/217 |
| 2015/0271053 A1* | 9/2015 | Kondo | ............... | H04L 45/123 370/238 |

FOREIGN PATENT DOCUMENTS

| | | |
|---|---|---|
| JP | 2012-105258 | 5/2012 |
| WO | 2008/097221 A1 | 8/2008 |

* cited by examiner

| LD | LS | GD | GS | FID | FRAME TYPE |

FIG. 3

| FIELD NAME | INFORMATION STORED |
|---|---|
| L D | NODE ID OF ADJACENT NODE DEVICE THAT IS TRANSMISSION DESTINATION |
| L S | NODE ID OF ADJACENT NODE DEVICE THAT IS TRANSMISSION SOURCE |
| G D | NODE ID OF NODE DEVICE THAT IS FINAL DESTINATION |
| G S | NODE ID OF NODE DEVICE THAT IS ISSUANCE SOURCE OF FRAME |
| F I D | FRAME ID IN NODE DEVICE THAT IS ISSUANCE SOURCE OF FRAME |
| FRAME TYPE | INFORMATION REPRESENTING TYPE OF FRAME |

| TRANSMISSION SOURCE ID | FID | FRAME TYPE | (GD1, ROUTE COST), (GD2, ROUTE COST), . . . . . |

| FIELD NAME | INFORMATION STORED |
|---|---|
| TRANSMISSION SOURCE ID | NODE ID OF NODE DEVICE THAT IS TRANSMISSION SOURCE OF FRAME |
| FID | FRAME ID IN NODE DEVICE THAT IS TRANSMISSION SOURCE OF FRAME |
| FRAME TYPE | INFORMATION REPRESENTING TYPE OF FRAME |
| SETS OF GD AND ROUTE COST | SETS OF NODE ID OF GD REACHABLE FROM NODE DEVICE THAT IS TRANSMISSION SOURCE AND MINIMUM ROUTE COST IN ROUTE FROM THAT GD TO NODE DEVICE THAT IS TRANSMISSION SOURCE |

FIG. 6

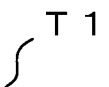
F I G. 7

| ADJACENT NODE DEVICE | NUMBER OF TIMES OF RECEPTION |
|---|---|
| N 4 | R C 4 |
| N 6 | R C 6 |
| ⋮ | ⋮ |

| GD | ADJACENT NODE DEVICE | LINK COST | ROUTE COST |
|---|---|---|---|
| .... | .... | .... | .... |
| N1 | N4 | $C_{Link}(N4, N7)$ | $C_{Route}(N1, ...., N4, N7)$ |
| | N6 | $C_{Link}(N6, N7)$ | $C_{Route}(N1, ...., N6, N7)$ |
| .... | .... | .... | .... |

T3

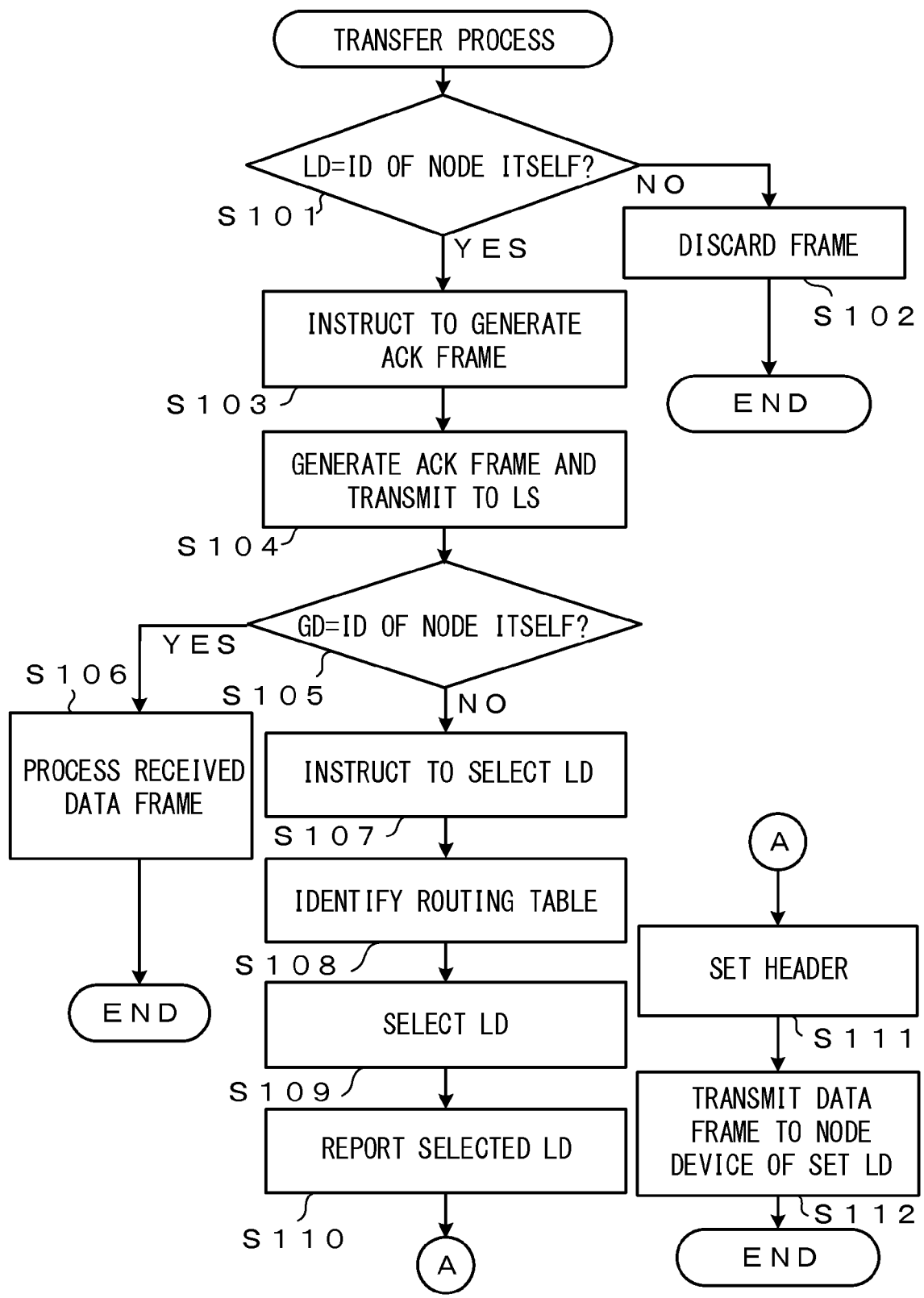
F I G. 11

ROUTE SELECTION METHOD, NODE DEVICE AND RELAY SYSTEM

CROSS-REFERENCE TO RELATED APPLICATION

This application is based upon and claims the benefit of priority of the prior Japanese Patent Application No. 2014-057264, filed on Mar. 19, 2014, the entire contents of which are incorporated herein by reference.

FIELD

The embodiments discussed herein are related to a route selection method, a node device and a relay system.

BACKGROUND

In recent years, development has been advanced for ad-hoc networks in which a plurality of communication devices (referred to as node devices hereinafter) are connected to each other in an autonomous-decentralized manner. Respective devices in an ad-hoc network construct networks autonomously in accordance with communication environments.

Specifically, in an ad-hoc network, no access points are provided and each node device relays a data frame received from a node device that is adjacent (referred to as an adjacent node device hereinafter), to a different adjacent node device on the basis of the network topology and thereby the data frame is transmitted to a final destination device such as a gateway device (referred to as a GW device hereinafter).

In this situation, each node device selects a route on the basis of route cost $C_{Route}$ for transmitting a data frame. In other words, when there are a plurality of routes connected to a final destination device, definition of route cost $C_{Route}$ determines which of the routes is selected by each device.

As representative definition of route cost $C_{Route}$, there is a method in which a hop count is used as route cost $C_{Route}$ and a method in which the integrated value of error rates of a link is used as route cost $C_{Route}$.

FIG. 1, which will be described later in detail, is referred to, and there are two routes from node device N7 to node device N1, i.e., route (N7, N6, N5, N1) that is via node devices N6 and N5 and route (N7, N4, N3, N2, N1) that is via node devices N4, N3 and N2.

When the hop count is used as route cost $C_{Route}$, the route cost $C_{Route}$ of route (N7, N6, N5, N1) is "3" and route cost $C_{Route}$ of route (N7, N4, N3, N2, N1) is "4". Accordingly, the route (N7, N6, N5, N1), which has the smaller hop count, is selected. However, when the error rate is high in the link between node devices N6 and N5, which are apart from each other by a long distance, there is a possibility that a data frame does not arrive at node device N1. In other words, using the hop count as route cost $C_{Route}$ decreases the arrival rate.

When the integrated value of error rates of a link is used as route cost $C_{Route}$ and a link between node devices Ni and Nj is expressed by "link Ni-Nj", the route cost $C_{Route}$ of route (N7, N6, N5, N1) is a value obtained by integrating error rates of link N7-N6, link N6-N5 and link N5-N1. Similarly, route cost $C_{Route}$ of route (N7, N4, N3, N2, N1) is a value obtained by integrating error rates of link N7-N4, link N4-N3, link N3-N2 and link N2-N1.

It is assumed that link N7-N4 and link N7-N6 have the same error rate, link N2-N1 and link N5-N1 have the same error rate, and the integrated value of the error rates of links N4-N3 and N3-N2 is smaller than the error rate of link N6-N5. In other words, it is assumed that the following formulas are satisfied. (error rate of link N7-N4)=(error rate of link N7-N6) (error rate of link N2-N1)=(error rate of link N5-N1) (error rate of link N4-N3)+(error rate of link N3-N2) <(error rate of link N6-N5)

In such a case, route (N7, N4, N3, N2, N1), having the smaller integrated value of error rates, is selected. By using the integrated value of error rates as route cost $C_{Route}$, the arrival rate can be increased, however, it increases the hop count, deteriorating the frequency usage efficiency and decreasing the maximum accommodation number.

As described above, the two factors are in trade-off relationship.

As another definition of route cost $C_{Route}$, there is for example definition of route cost $C_{Route}$ that is proposed in Patent Document 1. Route cost $C_{Route}$ proposed in Patent Document 1 is obtained by calculating the inverse number of a value obtained by multiplying the forward reception rate by the backward reception rate of each link in a route, i.e., (1/{(forward reception rate)×(backward reception rate)}), as link cost $C_{Link}$ of each link and by obtaining the integrated value of these link costs $C_{Link}$. Thereby, the method proposed in Patent Document 1 calculates route cost $C_{Route}$ by measuring the forward and backward reception rates of each link.

When link N7-N4 and link N7-N6 have the same error rate, link N7-N4 and link N7-N6 have the same link cost $C_{Link}$ in a case when link cost $C_{Link}$ is calculated by using the method proposed in Patent Document 1. Similarly, when link N2-N1 and link N5-N1 have the same error rate, link N2-N1 and link N5-N1 have the same link cost $C_{Link}$.

Accordingly, in this case, route (N7, N4, N3, N2, N1) is selected only when the following condition is met. (link cost $C_{Link}$ of link N4-N3)+(link cost $C_{Link}$ of link N3-N2)<(link cost $C_{Link}$ of link N6-N5)

Thereby, the method proposed in Patent Document 1 can suppress increase in a hop count while securing an arrival rate.

[Patent Document 1] Japanese Laid-open Patent Publication No. 2012-105258

SUMMARY

According to an aspect of the embodiments, a route selection method includes calculating by a processor a reception rate of frames of a particular frame type transmitted from an adjacent node device for which there is a link, calculating by the processor, on the basis of the calculated reception rate and a frame length of each frame type, an arrival rate, which is a rate at which the adjacent node device receives a data frame transmitted to the adjacent node device and the node device itself receives acknowledgement that the adjacent node device transmits to the node device itself when the data frame has been received, calculating by the processor an inverse number of the calculated arrival rate as a link cost of the link with the adjacent node device, obtaining by the processor from the adjacent node device a route cost, which is an integrated value of the link costs of the link in a route, for each route from the adjacent node device to each node device that is a reachable final destination, calculating by the processor a route cost of a route from the node device itself to each node device that is a final destination reachable via the adjacent node device by integrating the calculated link cost and the obtained route cost, and selecting by the processor an adjacent node device that is a transmission destination of a data frame as a transmission target on the basis of the route cost of a route from the node device itself to a node device that is a final destination of the data frame as a transmission target when the data frame is transmitted.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates a format example of the header of a data frame according to an embodiment.

FIG. 4 explains respective fields in the format example illustrated in FIG. 3.

FIG. 5 illustrates a format example of the header of a hello frame according to an embodiment.

FIG. 6 explains respective fields in the format example illustrated in FIG. 5.

FIG. 7 illustrates an example of frame length management table according to an embodiment.

FIG. 8 illustrates an example of number-of-times-of-reception management table according to an embodiment.

FIG. 9 illustrates an example of a routing table according to an embodiment.

FIG. 11 is an example of a flowchart for explaining the flow of a transfer process according to an embodiment.

DESCRIPTION OF EMBODIMENTS

Figure 1:
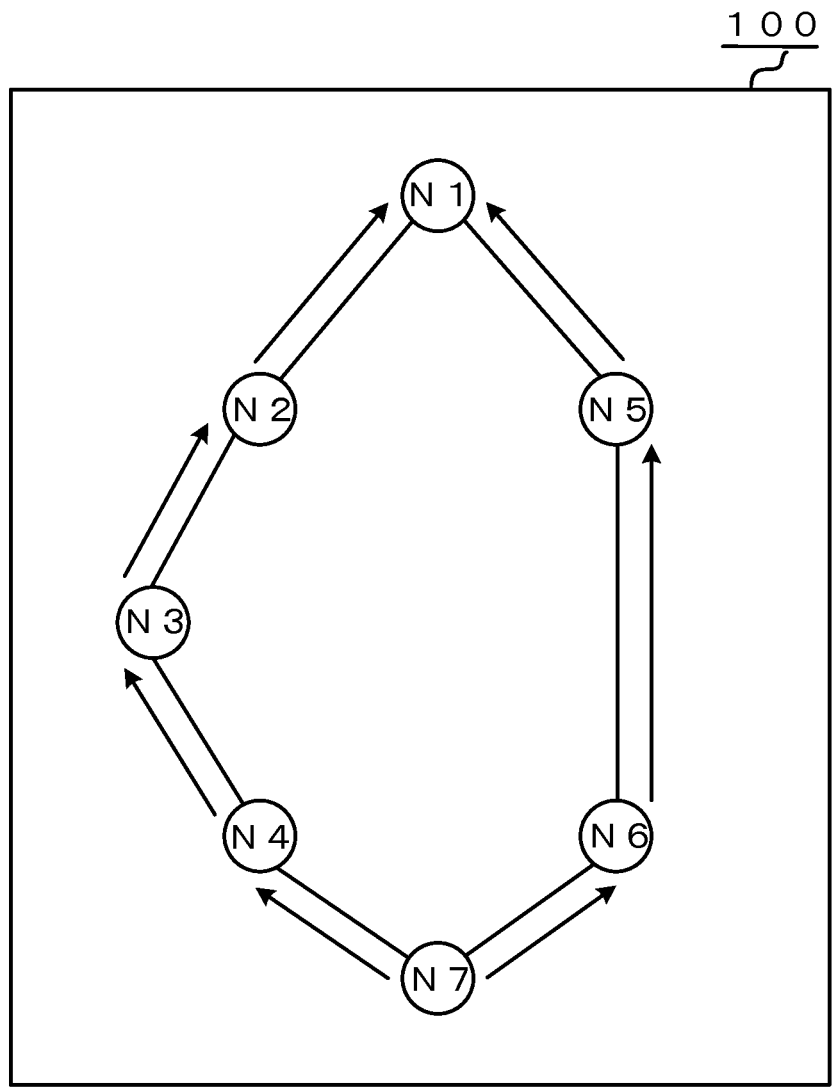
FIG. 1 illustrates a portion of a configuration example of a network according to an embodiment.

Hereinafter, embodiments of the present invention will be explained in detail by referring to the drawings.

FIG. 1 illustrates a portion of a configuration example of a network 100 according to the present embodiment. The network 100 is an example of an ad-hoc network, and includes a plurality of node devices 1. There are links between the node devices 1, and the links are represented by solid lines in FIG. 1.

The node device 1 is for example a meter-reading node device such as an electric power meter, a sensor node device including various types of sensors, or other devices. When the node device 1 is a sensor node device, the node device 1, autonomously or in accordance with instructions from a data server, collects pieces of information from a sensor or the like and transmits the collected pieces of information (data frames) to the data server.

In FIG. 1, node devices 1 are denoted by "Ni" (i=1, ..., 7). "Ni" is a node ID (IDentification), such as the address of the node device 1, that can identify the node device 1 uniquely. Hereinbelow, when particular node device 1 is referred to, it is referred to as "node device Ni" when for example the node device 1 whose node ID is Ni is referred to. Note that node device N1 in FIG. 1 is assumed to be a GW device.

Links may be wireless links or wired links. In FIG. 1 for example, when node device N1 and node device N2 can conduct communication directly not through relaying by the other node devices 1, the situation is expressed by "there is a link between node device N1 and node device N2".

Links change dynamically, and may be newly estimated between the node devices 1 and links that have been in an established state may be lost due to for example influence of weather, blocking objects, etc. Also, when for example the node device 1 is mobile, the presence or absence of links may be changed due to changes in the distances between the node devices 1. Also, due to for example changes in connection of cables, a new link may be established, a link that has been in an established state may be lost, and a link may be lost due to a failure such as disconnection of cables, etc.

Next, explanations will be given for an algorithm used for calculating link cost $C_{Link}$. In this algorithm, the arrival rate of unicast frames is calculated (estimated) for each link on the basis of the reception rate of hello frames alone, i.e., on the basis of the reception rate in one direction of a link alone. Then, the inverse number of the calculated arrival rate is calculated as link cost $C_{Link}$.

In the present embodiment, a unicast frame is a data frame or an ACK (ACKnowledgment) frame, and the arrival rate of unicast frames is a rate at which data frames arrive at an adjacent node device 1 which is the transmission destination of data frames and ACK frames from the adjacent node device 1 arrive at the node device 1 which is the transfer source of data frames. In other words, the arrival rate of unicast frames is a result of multiplying the forward reception rate (reception rate of data frames) by the backward reception rate (reception rate of ACK frames) of a link.

When the reception rate of one-bit data in one direction and the reception rate of hello frames having the frame length of $L_H$ bits are expressed by formulas 1 and 2, respectively, formula 3 is satisfied.

(THE RECEPTION RATE OF ONE-BIT DATA IN ONE DIRECTION)=$P_{Link}^{PAR(1)}$     [Formula 1]

(THE RECEPTION RATE OF HELLO FRAMES HAVING THE FRAME LENGTH OF $L_H$ BITS)=$P_{Link}^{PAR^H}$     [Formula 2]

$$P_{Link}^{PAR^H}=(P_{Link}^{PAR(1)})^{L^H}$$     [Formula 3]

Accordingly, the reception rate of one-bit data in one direction can be calculated by formula 4 below on the basis of the reception rate of a hello frames having the frame length of $L_H$ bits. In other words, the reception rate of one-bit data in one direction can be calculated by raising the reception rate of hello frames having the frame length of $L_H$ bits to the {inverse number of frame length $L_H$ (1/$L_H$)}-th power.

$$P_{Link}^{PAR(1)}=(P_{Link}^{PAR^H})^{1/L^H}$$     [Formula 4]

Also, the reception rate of data frames having the frame length of $L_D$ bits and the reception rate of ACK frames having the frame length of $L_A$ bits can be calculated by using the reception rate in of one-bit data one direction in accordance with formulas 5 and 6, respectively.

(THE RECEPTION RATE OF DATA FRAMES HAVING THE FRAME LENGTH OF $L_D$ BITS)=$(P_{Link}^{PAR(1)})^{L^D}$  [Formula 5]

(THE RECEPTION RATE OF ACK FRAMES HAVING THE FRAME LENGTH OF $L_A$ BITS)=$(P_{Link}^{PAR(1)})^{L^A}$  [Formula 6]

The arrival rate of unicast frames is a result of multiplying the forward reception rate of a link (reception rate of data frames) by the backward reception rate of the link (reception rate of ACK frames) as described above. Accordingly, the arrival rate of unicast frames can be expressed by formula 7 below on the basis of formulas 4, 5 and 6. In other words, the reception rate of unicast frames can be calculated on the basis of the reception rate of hello frames and the frame lengths of respective frames.

(THE ARRIVAL RATE OF UNICAST FRAMES)= $(P_{Link}^{PAR^H})^{(L^D+L^A)/L^H}$  [Formula 7]

Link cost $C_{Link}$ in the present embodiment is defined by formula 8 below. In other words, the inverse number of the arrival rate of unicast frames in a link is defined as link cost $C_{Link}$. In other words, link cost $C_{Link}$ in the present embodiment is the number of times of transmission required to succeed in transferring a data frame.

[Formula 8]

$$(\text{LINK COST } C_{Link}) = \frac{1}{(\text{THE ARRIVAL RATE OF UNICAST FRAMES})}$$
$$= \frac{1}{\left(P_{Link}^{PAR\_H}\right)^{(L_D+L_A)/L_H}}$$

Also, when the arrival rate of unicast frames in link Ni-Nj according to the present embodiment is expressed by formula 9 below, link cost $C_{Link}$ (Ni, Nj) of link Ni-Nj according to the present embodiment can be expressed by formula 10 below.

(THE ARRIVAL RATE OF UNICAST FRAMES IN LINK Ni-Nj)=$P_{Link}^{PAR}(Ni,Nj)$  [Formula 9]

$$(\text{LINK COST } C_{Link}(Ni, Nj)) = \frac{1}{P_{Link}^{PAR}(Ni, Nj)}$$  [Formula 10]

Route cost $C_{Route}$ according to the present embodiment is defined by formula 11 below. In other words, route cost $C_{Route}$ is defined as the integrated value of link costs $C_{Link}$ in links in the route.

(ROUTE COST $C_{Route}$)=(THE INTEGRATED VALUE OF LINK COSTS $C_{Link}$ IN LINKS IN THE ROUTE)  [Formula 11]

In such a case, by referring to FIG. 1, route cost $C_{Route}$ (N7, N6, N5, N1) of route (N7, N6, N5, N1) can be expressed by formula 12 below, and route cost $C_{Route}$ (N7, N4, N3, N2, N1) of route (N7, N4, N3, N2, N1) can be expressed by formula 13 below.

$C_{Route}(N7,N6,N5,N1)=C_{Link}(N7,N6)+C_{Link}(N6,N5)+C_{Link}(N5,N1)$  [Formula 12]

$C_{Route}(N7,N4,N3,N2,N1)=C_{Link}(N7,N4)+C_{Link}(N4,N3)+C_{Link}(N3,N2)+C_{Link}(N2,N1)$  [Formula 13]

As described above, because link cost $C_{Link}$ of each link is the inverse number of the arrival rate of unicast frames in the link, it can be calculated on the basis of the reception rate of hello frames and the frame lengths of respective frame types in the link. Accordingly, because route cost $C_{Route}$ is the integrated value of link costs $C_{Link}$ of respective links in the route, it can be calculated on the basis of the reception rate of hello frames and the frame length of each frame in each link in the route.

Figure 2:
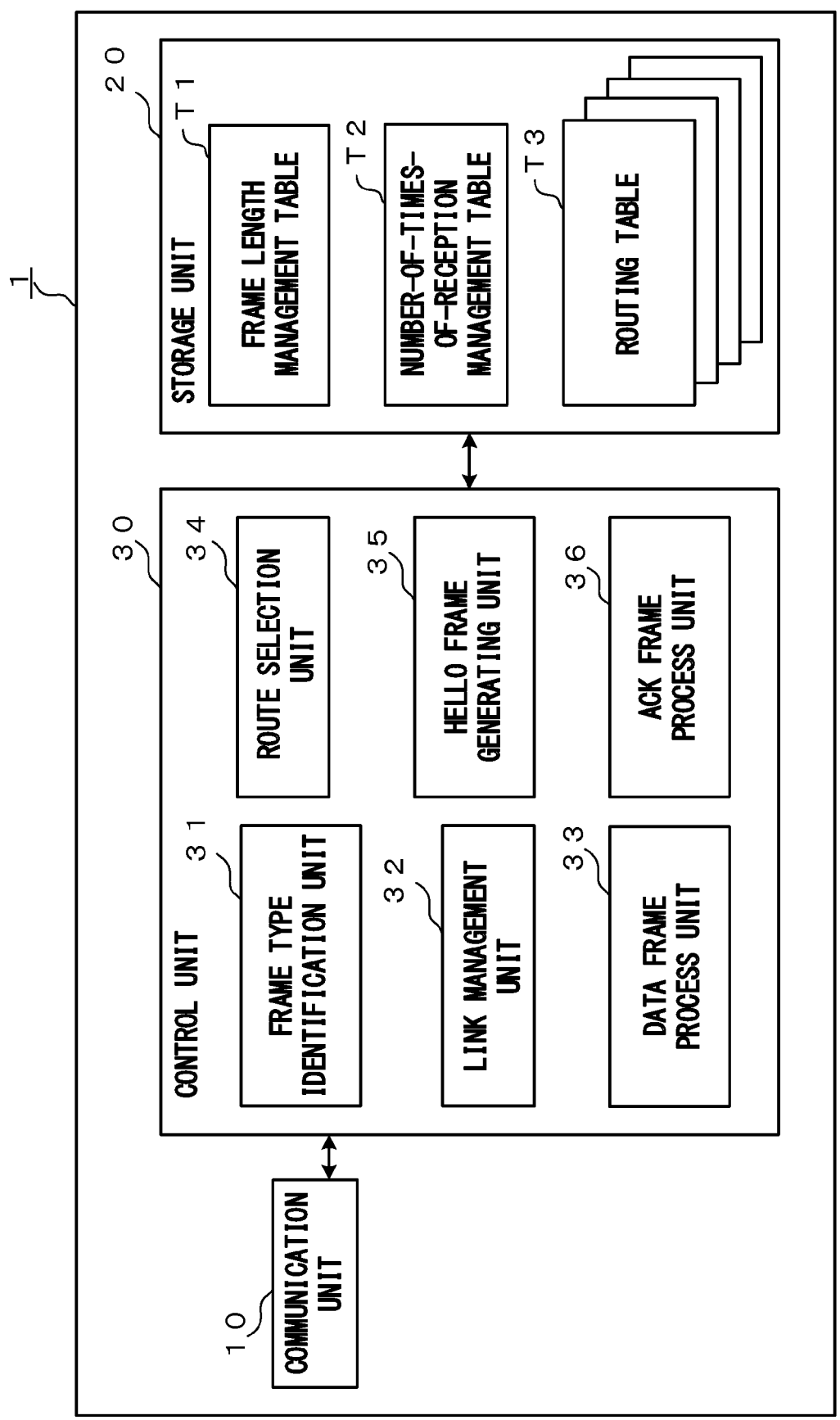
FIG. 2 is a functional block diagram illustrating a configuration example of node devices that constitute a network according to an embodiment.

Next, by referring to FIG. 2, the node devices 1 according to the present embodiment will be explained. FIG. 2 is a functional block diagram illustrating a configuration example of the node devices 1 that constitute the network 100 in the present embodiment.

As illustrated in FIG. 2, the node device 1 includes a communication unit 10, a storage unit 20 and a control unit 30.

The communication unit 10 includes for example a communication module or the like, and conducts communications with other node devices 1. For example, the communication unit 10 transmits and receives frames such as a hello frame. Also, receiving a frame, the communication unit 10 outputs the received frame to a frame type identification unit 31, which will be explained later in detail.

The storage unit 20 includes for example a random access memory (RAM), a read only memory (ROM), a flash memory, etc. The storage unit 20 functions as a work area of a micro-processing unit (MPU) included in the control unit 30, a program area for storing various types of programs such as an operation program for controlling the entire operation of the node device 1, and a data area for storing various types of data such as frame length management table T1, number-of-times-of-reception management table T2 and routing table T3, which will be explained later in detail. The data area also stores the ID of the node including that data area.

Figure 3:
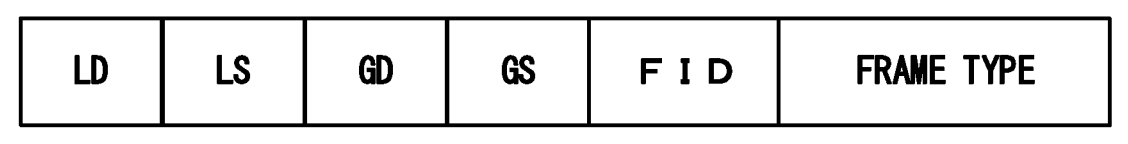

By referring to FIG. 3 and FIG. 4, explanations will be given for the header of a data frame generated by a data frame process unit 33, which will be explained later. FIG. 3 illustrates a format example of the header of a data frame according to the present embodiment. FIG. 4 explains the respective fields in the format example illustrated in FIG. 3.

The header of a data frame according to the present embodiment includes LD (Local Destination), LS (Local Source), GD (Global Destination), GS (Global Source), FID (Frame IDentification) and frame type as illustrated in FIG. 3.

An LS is the node device 1 that is the transmission source of a data frame, and the LS of a data frame transmitted by node device N7 to node device N6 is node device N7 in accordance with FIG. 1 for example. An LD is the adjacent node device 1 that serves as a transmission destination, and a route selection unit 34, which will be described later in detail, of the node device 1 serving as the LS refers to routing table T3 so as to select an LD. For example the LD of the data frame transmitted by node device N7 to node device N6 is node device N6 in accordance with FIG. 1.

A GS is the node device 1 that is the issuance source of a data frame, and a GD is the node device 1 that is the final destination of the data frame. For example, in accordance with FIG. 1, when a data frame issued by node device N7 is relayed in the order of node device N6 and N5 and is transmitted to node device N1 as the final destination, the GD of that data frame is node device N1 and the GS is node device N7.

An FID is a frame ID in the node device 1 that is the issuance source of a data frame, i.e., a serial number representing the number of times of generating data frames in the node device 1 that is the issuance source of a data frame.

A frame type is information representing types of a frame, and in a data frame, information indicating that the type of the frame is a data frame is stored in the "frame type" field. As types of frames, there are three types; data frame, ACK frame and hello frame, in the present embodiment.

A data frame is a frame including, as a payload, information that is to be delivered to the node device 1 (GD) that is the final destination of the frame by the node device 1 (GS) that is the issuance source of the frame.

An ACK frame is a frame transmitted by the node device (LD) that received a data frame in order to report "the reception of a data frame" to the node device 1 (LS) that transmitted the data frame. In other words, it is acknowledgement.

A hello frame is generated by a hello frame generating unit 35, which will be described later in detail, and a frame for reporting the existence of the node device 1 to other node devices 1, and includes information needed to generate routes as will be explained later.

Next, by referring to FIG. 5 and FIG. 6, explanations will be given for the header of a hello frame generated by the hello frame generating unit 35. FIG. 5 illustrates a format example of the header of a hello frame according to the present embodiment. FIG. 6 explains the respective fields in the format example illustrated in FIG. 5.

The header of a hello frame according to the present embodiment includes a transmission ID, an FID, a frame type, and sets of a GD and route cost $C_{Route}$.

A transmission ID is the node ID of the node device 1 that is the transmission source of a hello frame, and is for example the address of the node device 1 that is the transmission source of a hello frame.

An FID is the frame ID in the node device 1 that is the transmission source of a hello frame, i.e., a serial number representing the number of times of generating hello frames in the node device 1 that is the transmission source of a hello frame.

A frame type is information representing the type of a frame, and in a hello frame, information indicating that the type of the frame is a hello frame is stored in the "frame type" field.

Sets of a GD and route cost $C_{Route}$ are sets of the node ID of the final destination (GD) that can be reached from the node device 1 that is the transmission source of a hello frame and the minimum of route costs $C_{Route}$ in the routes from the GD to the node device 1 that is the transmission source of the hello frame.

Next, by referring to FIG. 7 through FIG. 9, explanations will be given for frame length management table T1, number-of-times-of-reception management table T2 and routing table T3 that are stored in data areas in the storage unit 20.

FIG. 7 illustrates an example of frame length management table T1 in the present embodiment. Frame length management table T1 in the present embodiment is a table referred to by for example a link management unit 32, which will be explained later in detail, for calculating link cost $C_{Link}$, and is a table in which "frame type" and "frame length" are associated as illustrated in FIG. 7.

FIG. 8 illustrates an example of number-of-times-of-reception management table T2 according to the present embodiment, and is an example of number-of-times-of-reception management table T2 of node device N7. Number-of-times-of-reception management table T2 according to the present embodiment is a table managed by the link management unit 32, and is a table in which "node ID of adjacent node device 1" and "the number of times of reception" are associated as illustrated in FIG. 8.

The number of times of reception is the number of times of receiving hello frames transmitted from the corresponding adjacent node device 1, and is incremented by the link management unit 32 each time a hello frame is received from the corresponding adjacent node device 1.

FIG. 9 illustrates an example of routing table T3 according to the present embodiment, and is an example of routing table T3 of node device N7. Routing table T3 according to the present embodiment is a table in which information (route costs of each route) needed to select the adjacent node device 1 serving as the transmission destination of a data frame is managed for each GD by the link management unit 32. For example, routing table T3 according to the present embodiment is a table in which "node ID of GD", "node ID of adjacent node device 1", "link cost $C_{Link}$" and "route cost $C_{Route}$" are associated as illustrated in FIG. 9.

The node ID of the adjacent node device 1 is the node ID of the adjacent node device 1 that is a candidate for a transmission destination when a data frame is transmitted to a corresponding GD.

Link cost $C_{Link}$ is link cost $C_{Link}$ of a link in relation to the corresponding adjacent node device 1. Route cost $C_{Route}$ is an integrated value of link costs $C_{Link}$ of respective links in the route from the GD to the node device 1 itself, and the integrated value of route cost $C_{Route}$ included in a hello frame from the corresponding adjacent node device 1 and link cost $C_{Link}$ of a link in relation to the corresponding adjacent node device 1 is stored in by the link management unit 32.

FIG. 2 is referred to again, and the control unit 30 includes for example an MPU or the like, and executes the operation program stored in the program area in the storage unit 20 so as to implement the functions of the frame type identification unit 31, the link management unit 32, the data frame process unit 33, the route selection unit 34, the hello frame generating unit 35 and an ACK frame process unit 36 as illustrated in FIG. 2. Also, the control unit 30 executes the operation program so as to execute a process of controlling the entire node device 1 and processes such as a frame reception process and a hello frame generating process, which will be explained later in detail, etc.

The frame type identification unit 31 identifies the type of a frame received by the communication unit 10. Specifically, receiving a frame, the communication unit 10 outputs the received frame to the frame type identification unit 31. The frame type identification unit 31 analyzes the header of the input frame, and identifies the type of the frame on the basis of the frame type of the header. The frame type identification unit 31 outputs the received frame to the link management unit 32 when the identified type of the frame is hello frame, to the data frame process unit 33 when the identified type of the frame is data frame, and to the ACK frame process unit 36 when the identified type of the frame is ACK frame, respectively.

The link management unit 32 manages transfer routes by managing number-of-times-of-reception management table T2 and routing table T3. More specifically, the link management unit 32 analyzes a received hello frame when the received frame is a hello frame, and updates number-of-times-of-reception management table T2 and routing table T3 on the basis of the analysis result.

For example, the link management unit 32 identifies the adjacent node device 1 that is the transmission source of the hello frame on the basis of the transmission source ID of the received hello frame. Then, the link management unit 32 refers to number-of-times-of-reception management table T2, and increments the number of times of reception corresponding to the identified adjacent node device 1. In this process, the link management unit 32 adds an entry when the node ID identical to the transmission source ID of the received hello frame does not exist, and associates the transmission source ID with the number of times of reception "1" so as to store them.

Also, for example the link management unit 32 identifies the number of times of transmission of hello frames in the node device 1 that is the transmission source of received hello frame on the basis of the FIDs of the received hello frame. Then, the link management unit 32 calculates the reception rate of hello frames on the basis of the number of times of reception after being incremented and the identified number of times of transmission, and also refers to frame length management table T1 so as to obtain the frame length ($L_D$, $L_A$, $L_H$) of each frame type.

Then, the link management unit 32 calculates the arrival rate of unicast frames in the link with the node device 1 that is the transmission source of the received hello frames by using above formula 7 in accordance with the calculated reception rate of hello frames and the frame lengths of the respective frame types. Then, the link management unit 32 calculates the inverse number of the calculated arrival rate as link cost $C_{Link}$, and uses calculated link cost $C_{Link}$ so as to update link cost $C_{Link}$ corresponding to the identified adjacent node device 1 in routing table T3.

When routing table T3 does not include the entry of the identified adjacent node device 1 or when there is not an entry of the identified adjacent node device 1 in part of the GD associated with route cost $C_{Route}$ included in a hello frame, the link management unit 32 adds an entry and stores the calculated link cost $C_{Link}$ in the corresponding field.

Further, by using a value obtained by integrating route cost $C_{Route}$ associated with the GD included in the received hello frame and the calculated link cost $C_{Link}$, the link management unit 32 updates route cost $C_{Route}$ corresponding to the identified adjacent node device 1 (transmission source) of the corresponding GD in routing table T3.

The data frame process unit 33 performs a process for a received data frame. More specifically, when a data frame has been input from the frame type identification unit 31, the data frame process unit 33 analyzes the header of the input data frame, and determines whether or not the LD is identical to the node ID of the node device 1 of the data frame process unit 33. Then, the data frame process unit 33 discards the received data frame when the LD is not identical to the node ID of the node device 1 of the data frame process unit 33.

When the LD is identical to the node ID of the node device 1 of the data frame process unit 33, the data frame process unit 33 instructs the ACK frame process unit 36 to generate an ACK frame, and determines whether or not the GD is identical to the node ID of the node device 1 of the data frame process unit 33. In other words, the data frame process unit 33 determines whether or not the final destination of the received data frame is the node device 1 of the data frame process unit 33.

When the final destination of the received data frame is the node device 1 of the data frame process unit 33, the data frame process unit 33 outputs the received data frame to a higher layer. The higher layer performs a process on the received data frame in response to the inputting of the data frame When the final destination of the received data frame is a different node device 1, the data frame process unit 33 instructs the route selection unit 34 to select an LD in order to transfer the received data frame.

When the LD selected by the route selection unit 34 has been reported, the data frame process unit 33 performs a transmission process on the data frame. More specifically, when the LD selected by the route selection unit 34 has been reported, the data frame process unit 33 sets the node ID of the node device 1 of the data frame process unit 33 as the LS in the header and sets the LD selected by the route selection unit 34 as the LD of the header. Then, the data frame process unit 33 transfers the data frame to the adjacent node device 1, which is the set LD, via the communication unit 10.

Further, the data frame process unit 33 generates a data frame and transmits the generated data frame to the adjacent node device 1 via the communication unit 10 in response to a request from a high layer. In this process, the adjacent node device 1 that is the transmission destination is selected by the route selection unit 34 in accordance with the GD.

When it is necessary to transfer a received data frame to a different node device 1, the route selection unit 34 refers to routing table T3, and selects the adjacent node device 1 that is the transmission destination of the received data frame, i.e., the LD. Then, the route selection unit 34 reports the selected LD to the data frame process unit 33.

More specifically, when it is instructed by the data frame process unit 33 to select an LD, the route selection unit 34 identifies routing table T3 that corresponds to the GD of the data frame. Then, the route selection unit 34 selects the adjacent node device 1 that serves as a transmission destination, i.e., an LD, so that route cost $C_{Route}$ to the GD is minimum, on the basis of route cost $C_{Route}$ in identified routing table T3.

When a prescribed timing (for example, periodical timing) has arrived, the hello frame generating unit 35 generates a hello frame exemplified in FIG. 5, and transmits the generated hello frame to the adjacent node device 1 via the communication unit 10. In this process, the hello frame generating unit 35 refers to routing table T3, identifies, for each registered GD, minimum route cost $C_{Route}$ among route costs $C_{Route}$ of the adjacent node devices 1 corresponding to respective GDs, and associates the identified route costs $C_{Route}$ with the node IDs of the corresponding GDs so as to store them in hello frames respectively.

In response to the instruction from the data frame process unit 33 to generate an ACK frame, the ACK frame process unit 36 generates an ACK frame and transmits via the communication unit 10 the generated ACK frame to the node device 1 (LS) that is the transmission source of the received frame.

Figure 10:
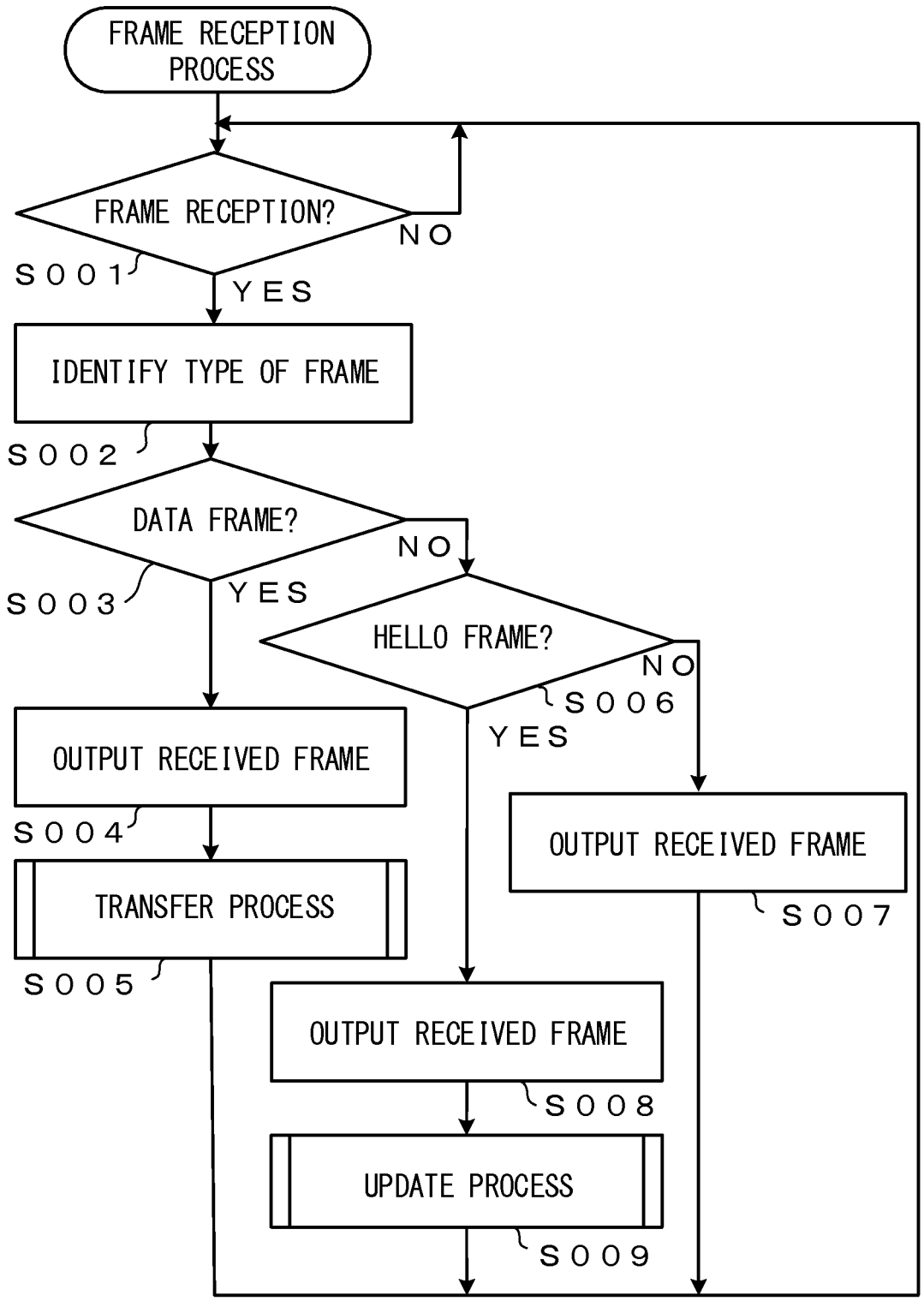
FIG. 10 is an example of a flowchart for explaining the flow of a frame reception process according to an embodiment.

Next, by referring to FIG. 10, the flow of a frame reception process according to the present embodiment will be explained. FIG. 10 is an example of a flowchart for explaining the flow of a frame reception process according to the present embodiment. This frame reception process is triggered by the reception of a frame.

The frame type identification unit 31 determines whether or not a frame has been received (step S001). When it has been determined by the frame type identification unit 31 that a frame has not been determined (NO in step S001), the process repeats the process in step S001, and waits for the reception of a frame.

When it is determined that a frame has been received (YES in step S001), the frame type identification unit 31 analyzes the header of the received frame, identifies the type of the frame on the basis of the frame type (step S002), and determines whether or not the identified type is a data frame (step S003).

When it is determined that the identified type is a data frame (YES in step S003), the frame type identification unit 31 outputs the received frame to the data frame process unit 33 (step S004). Then, the data frame process unit 33 performs a process of transferring the received data frame together with the route selection unit 34 etc., and the process returns to the process in step S001 so as to repeat the above processes.

When it is determined that the identified type is not a data frame (NO in step S003), the frame type identification unit 31 further determines whether or not the identified type is a hello frame (step S006).

When it is determined that the identified type is an ACK frame (NO in step S006), the frame type identification unit 31 outputs the received ACK frame to the ACK frame process unit 36 (step S007), and the process returns to the process in step S001 so as to repeat the above processes.

When it is determined that the identified type is a hello frame (YES in step S006), the frame type identification unit 31 outputs the received frame to the link management unit 32 (step S008). Then, the link management unit 32 performs a process of updating number-of-times-of-reception management table T2 and routing table T3 (step S009), and the process returns to the process in step S001 so as to repeat the above processes.

Next, by referring to FIG. 11, explanations will be given for the flow of a transfer process according to the present embodiment. FIG. 11 is an example of a flowchart for explaining the flow of a transfer process according to the present embodiment. This transfer process corresponds to the process in step S005 in the above frame reception process.

The data frame process unit 33 analyzes the header of the received data frame, and determines whether or not the LD is identical to the node ID of the node device 1 of the data frame process unit 33 (step S101).

When it is determined that the LD is not identical to the node ID of the node device 1 of the data frame process unit 33 (NO in step S101), the data frame process unit 33 discards the received data frame (step S102). Then, the present process is terminated.

When it is determined that the LD is identical to the node ID of the node device 1 of the data frame process unit 33 (YES in step S101), the data frame process unit 33 instructs the ACK frame process unit 36 to generate an ACK frame (step S103). The ACK frame process unit 36 generates an ACK frame, and transmits the generated ACK frame to the node device 1 (LS) that is the transmission source via the communication unit 10 (step S104).

Then, the data frame process unit 33 determines whether or not the GD is identical to the node ID of the node device 1 of the data frame process unit 33 (step S105). In other words, the data frame process unit 33 determines whether or not the final destination of the received data frame is the node device 1 of the data frame process unit 33.

When it is determined that the GD is identical to the node ID of the node device 1 of the data frame process unit 33 (YES in step S105), the data frame process unit 33 outputs the received data frame to a higher layer, and the received data frame is processed in the higher layer in response to the input of the data frame (step S106). Then, the present process is terminated.

When it is determined that the GD is not identical to the node ID of the node device 1 of the data frame process unit 33 (NO in step S105), the data frame process unit 33 instructs the route selection unit 34 to select an LD (step S107).

The route selection unit 34 that has been instructed to select an LD identifies routing table T3 corresponding to the GD of the received data frame (step S108), and selects an LD so that route cost $C_{Route}$ to the GD is minimum (step S109). Then, the route selection unit 34 reports the selected LD to the data frame process unit 33 (step S110).

The data frame process unit 33 that has received the report of the selected LD sets the header (step S111), and transfers the data frame to the adjacent node device 1 that is the LD selected by the route selection unit 34 (step S112). Then, the present process is terminated.

Figure 12:
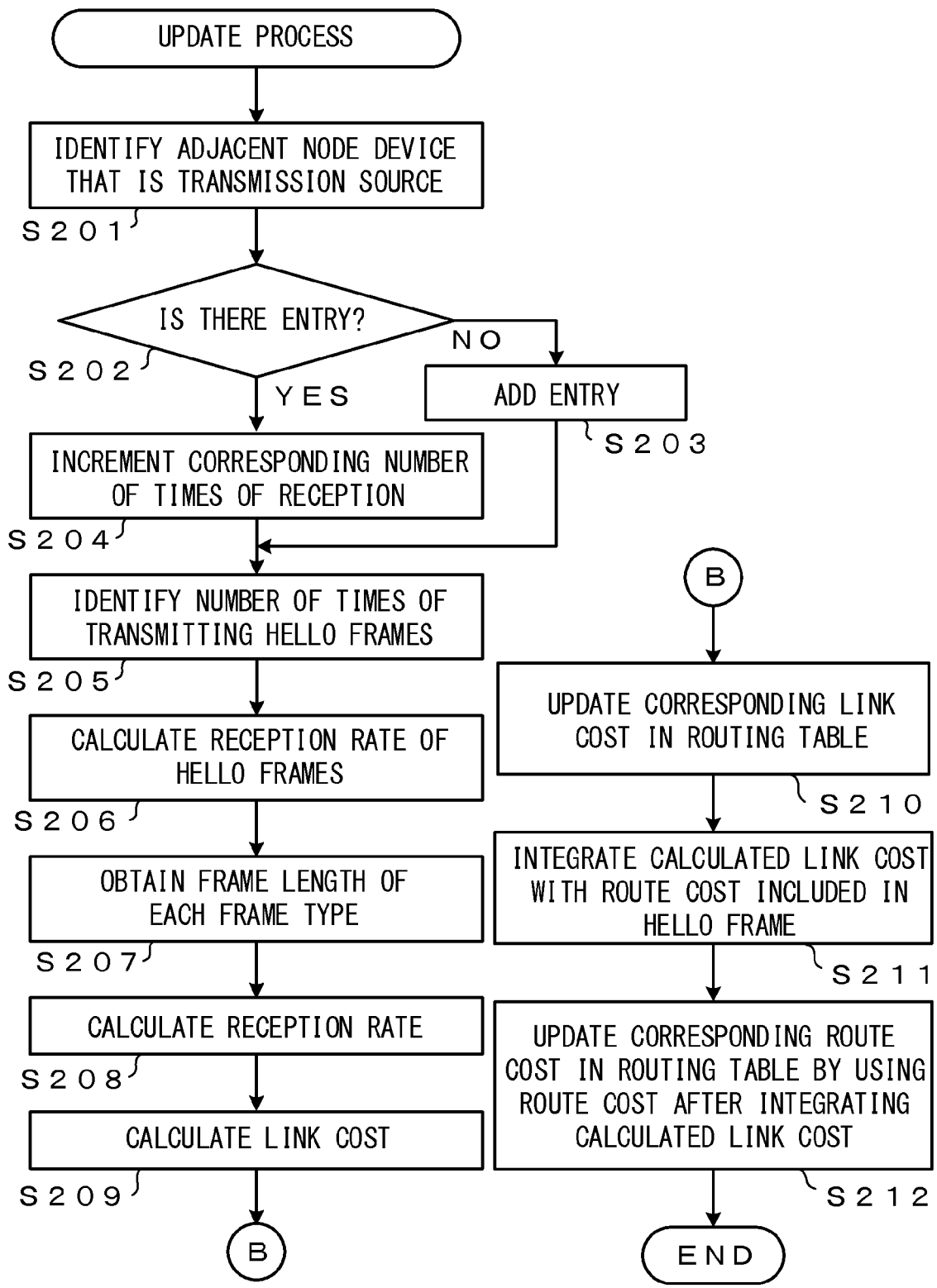
FIG. 12 is an example of a flowchart for explaining the flow of an update process according to an embodiment.

Next, by referring to FIG. 12, explanations will be given for the flow of an update process according to the present embodiment. FIG. 12 is an example of a flowchart for explaining the flow an update process according to the present embodiment. The present embodiment corresponds to the process in step S009 in the above frame reception process.

The link management unit 32 analyzes the received hello frame, identifies the adjacent node device 1 that is the transmission source of the received hello frame on the basis of the transmission source ID (step S201), and determines whether or not the entry of the identified adjacent node device 1 is included in number-of-times-of-reception management table T2 (step S202).

When it is determined that the entry of the identified adjacent node device 1 does not exist (NO in step S202), the link management unit 32 adds an entry, associates the transmission source ID with the number of times of reception "1" and stores them in number-of-times-of-reception management table T2 (step S203). Then, the process proceeds to step S205, which will be described later.

When it is determined that the entry of the identified adjacent node device 1 exists (YES in step S202), the link management unit 32 increments the number of times of reception corresponding to the identified adjacent node device 1 (step S204).

Then, the link management unit 32 identifies the number of times of transmission of hello frames in the node device 1 that is the transmission source of the received hello frame on the basis of the FID of the received hello frame (step S205). Then, the link management unit 32 calculates the reception rate of hello frames on the basis of the number of times of reception after being incremented and the identified number of times of transmission (step S206) and obtains frame lengths ($L_D$, $L_A$, $L_H$) of respective frame types by referring to frame length management table T1 (step S207).

Then, the link management unit 32 calculates the arrival rate of unicast frames in the link in relation to the node device 1 that is the transmission source of the received hello frame in accordance with formula 7 above on the basis of the calculated reception rate of the hello frames and the obtained frame length of each frame type (step S208).

The link management unit 32 calculates the inverse number of the calculated arrival rate as link cost $C_{Link}$ (step S209), and updates link cost $C_{Link}$ corresponding to the identified adjacent node device 1 in routing table T3 by using the calculated link cost $C_{Link}$ (step S210). In this process, when the entry of the identified adjacent node device 1 does not exist in routing table T3 or when the entry of the identified adjacent node device 1 does not exist in a portion of the GD associated in route cost $C_{Route}$ included in the hello frame, the link management unit 32 adds an entry and stores the calculated link cost $C_{Link}$ in the corresponding field.

Then, the link management unit 32 integrates the calculated link cost $C_{Link}$ and each route cost $C_{Route}$ included in the received hello frame so as to calculate route cost $C_{Route}$ of the route to the node device 1 of the link management unit 32 (step S211).

Then, the link management unit 32 updates the corresponding route cost $C_{Route}$ in routing table T3 by using route cost $C_{Route}$ after integrating the calculated link cost $C_{Link}$ and each route cost $C_{Route}$ included in the received hello frame (step S212). Then, the present process is terminated.

Figure 13:
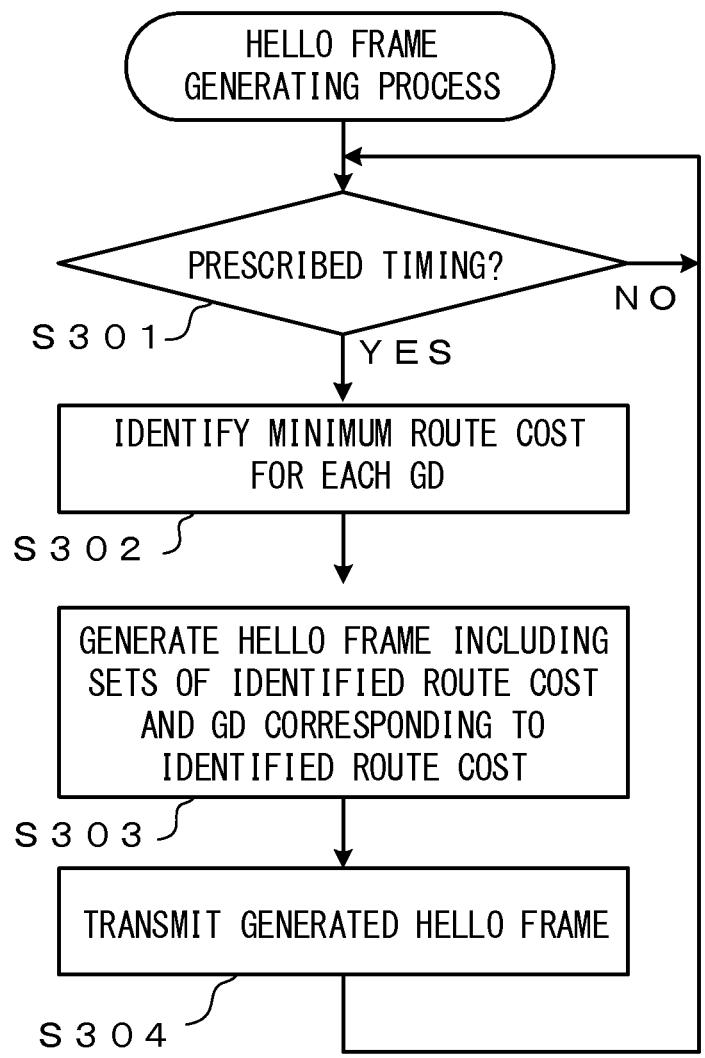
FIG. 13 is an example of a flowchart for explaining the flow of a hello frame generating process according to an embodiment.

Next, by referring to FIG. 13, explanations will be given for the flow of a hello frame generating process according to the present embodiment. FIG. 13 is an example of a flowchart for explaining the flow of a hello frame generating process according to the present embodiment. The present hello frame generating process is triggered by the arrival of a prescribed timing.

The hello frame generating unit 35 determines whether or not a prescribed timing has arrived (step S301). When the hello frame generating unit 35 determines that the prescribed timing has not arrived (NO in step S301), the process repeats the process in step S301 so as to wait for the prescribed timing to arrive.

When it is determined that the prescribed timing has arrived (YES in step S301), the hello frame generating unit 35 refers to routing table T3 and identifies, for each registered GD, minimum route cost $C_{Route}$ among route costs $C_{Route}$ of the adjacent node devices 1 corresponding to respective GDs (step S302). Then, the hello frame generating unit 35 generates a hello frame including sets of the identified route cost $C_{Route}$ and the node ID of the corresponding GD (step S303).

Then, the hello frame generating unit 35 transmits the generated hello frame to the adjacent node device 1 via the communication unit 10 (step S304). Then, the process returns to step S301, and repeats the above processes.

According to the above embodiment, the node device 1 calculates the reception rate of frames of a particular frame type transmitted by the adjacent node device 1 for which there is a link, calculates the arrival rate of unicast frames on the basis of the calculated reception rate and the frame length of each frame type, and calculates the inverse number of the calculated arrival rate as link cost $C_{Link}$ of that link. Then, the node device 1 obtains, from the adjacent node device 1, route cost $C_{Route}$ that is a result of integrating link costs $C_{Link}$ in the links in the route for each route to each GD that can be reached from the adjacent node device 1 that is the transmission source of the frame. Then, the node device 1 integrates the calculated link cost $C_{Link}$ and obtained route cost $C_{Route}$ so as to calculate route cost $C_{Route}$ of the route to each GD that can be reached from node device 1 itself via the adjacent node device 1 that is the transmission source of the frame. Then, the node device 1 selects the adjacent node device 1 that is the transmission destination of a data frame on the basis of route cost $C_{Route}$ of the route from the node device 1 itself to the GD of the data frame that is a transmission target.

Thereby, it is possible to suppress increase in the hop count while securing an arrival rate in a simple manner.

Figure 14:
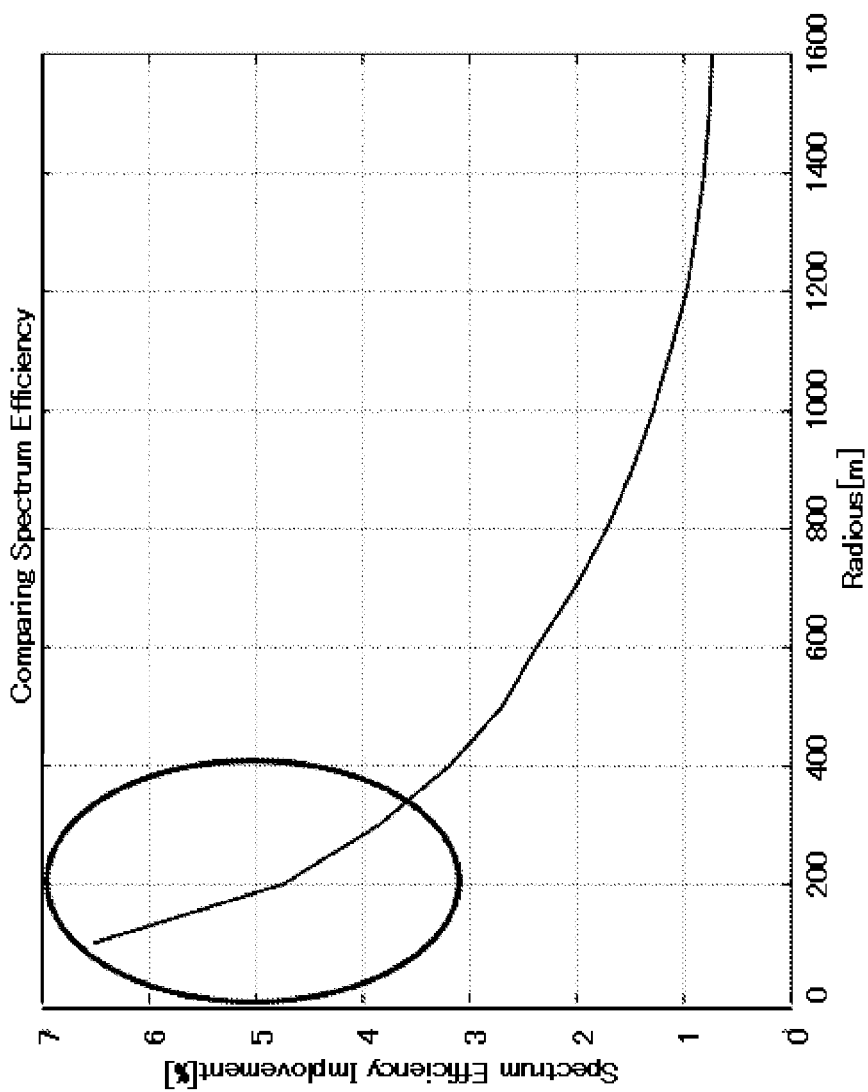
FIG. 14 is a graph illustrating increase rates of frequency usage efficiency.

FIG. 14 is a graph illustrating increase rates of the frequency usage efficiency. More specifically, the graph illustrated in FIG. 14 is a graph in which the increase rate of the frequency usage efficiency is illustrated for each accommodation radius of a GW device for the frequency usage efficiency when route cost $C_{Route}$ is treated as a hop count in a case where the inverse number of the arrival rate of unicast frames is treated as link cost $C_{Link}$ and the integrated value of link costs $C_{Link}$ is treated as route cost $C_{Route}$.

As illustrated in FIG. 14, the smaller the accommodation radius is, the higher the frequency usage efficiency becomes. Accordingly, in an operation in urban areas, where the density of the node devices 1 is high, it is possible to greatly increase the number of accommodated devices.

Also, according to the above embodiment, the node device 1 calculates the reception rate of hello frames and calculates link cost $C_{Link}$ on the basis of the calculated reception rate of hello frames. Thereby, because hello frames are transmitted periodically, link costs $C_{Link}$ can be calculated periodically. Accordingly, it is possible to maintain an appropriate route.

Also, according to the above embodiment, the node device 1 selects the adjacent node device 1 that is the transmission destination of a data frame so that route cost $C_{Route}$ of the route from the node device 1 itself to the GD of the data frame that is a transmission target is minimum. Thereby, it is possible to select a more appropriate route.

Also, according to the above embodiment, the node device 1 calculates the reception rate on the basis of the number of times of reception of frames of a particular frame type and the number of times of transmitting frames of a particular frame type to the node device 1 itself included in the frame of the particular frame type. Thereby, it is possible to calculate link cost $C_{Link}$ without increasing loads on the network in a simple manner.

Also, in the above embodiment, explanations were given for a case where the arrival rate of unicast frames is calculated on the basis of the reception rate of hello frames and the frame length of each frame type, however, the scope of the present embodiments is not limited to this, and the arrival rate of unicast frames may be calculated on the basis of the reception rate of data frames (or the reception rate of ACK frames) and the frame length of each frame type.

For example, it is possible to calculate the reception rate of one-bit data in one direction by using a similar method on the basis of the reception rate of data frames and frame length $L_D$ of data frames. Accordingly, it is possible to calculate the arrival rate of unicast frames on the basis of the reception rate of data frames. In such a case, the number of times of transmitting data frames to the adjacent node device 1 that is the transmission destination is included in a data frame. However, because hello frames are transmitted periodically, link costs $C_{Link}$ can be calculated periodically. Therefore, it is preferable to calculate link cost $C_{Link}$ on the basis of the reception rate of hello frames.

Also, in the above embodiment, explanations were given on an assumption that the frame length of each frame type is fixed, however, the scope of the present embodiments is not limited to this, and it is also possible for example to calculate link cost $C_{Link}$ by using the frame length of each frame type as the maximum frame length that can be used in the wireless communication scheme that is being used when the frame length is variable. It is also possible to calculate average values of frame lengths of the respective frame types so as to calculate link cost $C_{Link}$ by using the calculated average values.

Figure 15:
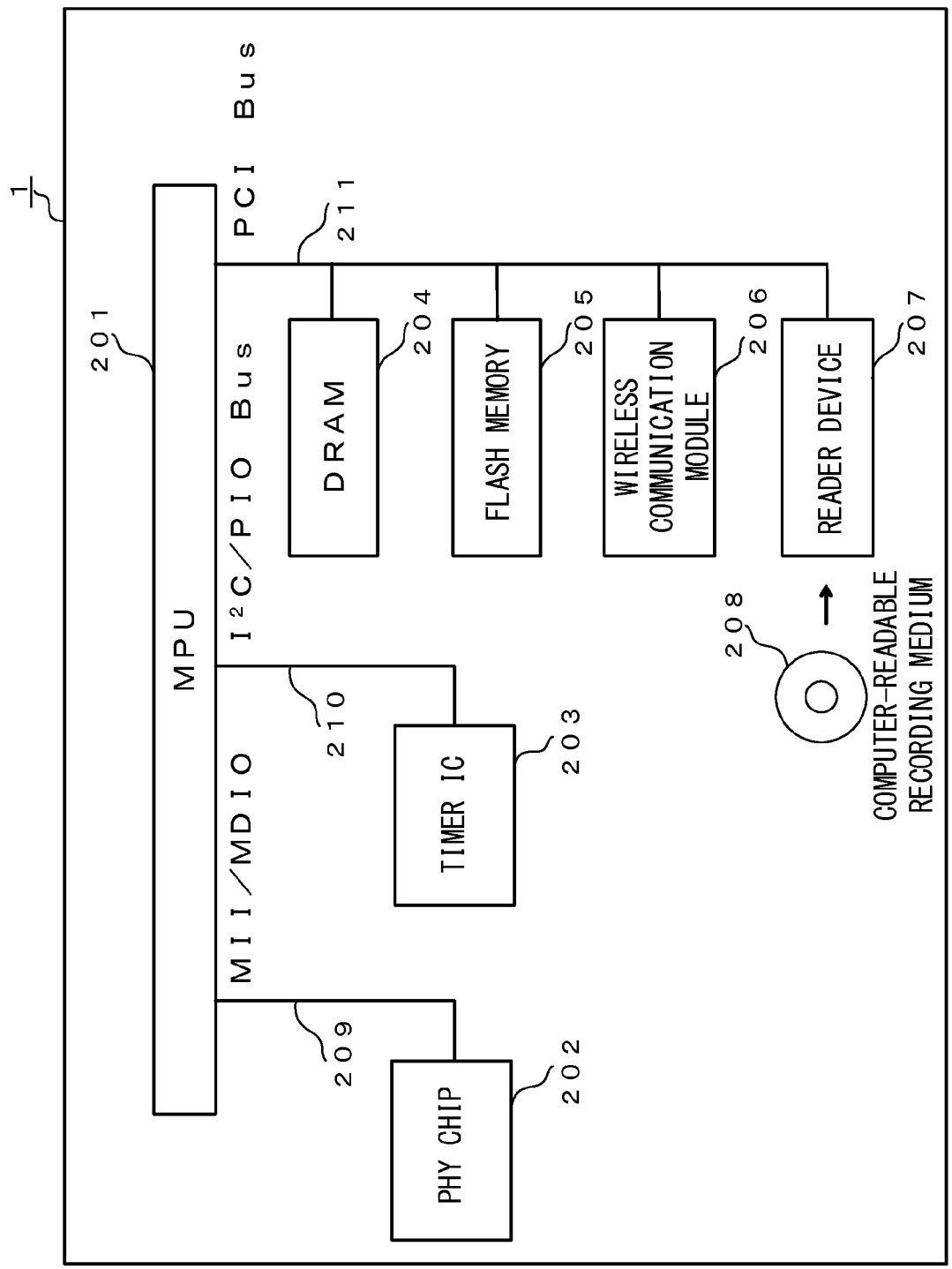
FIG. 15 illustrates an example of a hardware configuration of the node device according to an embodiment.

FIG. 15 illustrates an example of a hardware configuration of the node device 1 according to an embodiment. The node device 1 illustrated in FIG. 2 may be implemented for example by various types of hardware illustrated in FIG. 15. In the example illustrated in FIG. 15, the node device 1 includes an MPU 201, a PHY (PHYsical layer) chip 202 and a timer IC (Integrated Circuit) 203. Also, the node device 1 includes a dynamic random access memory (DRAM) 204, a flash memory 205, a wireless communication module 206 and a reader device 207.

The communication interface connecting the MPU 201 and the PHY chip 202 is MII/MDIO (Media Independent Interface or Management Data Input/Output) 209. MII and MDIO are both interfaces between the physical layer and the MAC (Media Access Control) sub layer. Also, the MPU 201 and the timer IC 203 are connected via an I²C/PIO (Inter-Integrated Circuit or Parallel Input/Output) bus 210. The DRAM. 204, the flash memory 205, the wireless communication module 206, and the reader device 207 are connected to the MPU 201 via a PCI (Peripheral Component Interconnect) bus 211.

The MPU 201 loads onto the DRAM 204 an operation program stored in the flash memory 205 that is a type of a non-volatile storage device, and executes various processes by using the DRAM 204 as a working memory. The MPU 201 can implement the respective functional units in the control unit 30 illustrated in FIG. 2 by executing the operation program.

It is also possible to store the operation program for performing the above operations in computer-readable recording media 208 such as a flexible disk, a Compact Disk-Read Only Memory (CD-ROM), a Digital Versatile Disk (DVD), a Magneto Optical disk (MO), etc. so as to distribute the media 208 so that the program is read by the reader devices 207 in the node devices 1 to install them in computers in order to execute the above processes. Further, it is also possible to store the operation program in a disk device etc. included in a server device in the Internet so that the operation program is downloaded to the computers of the node devices 1 via the PHY chips 202 or the wireless communication modules 206.

Note that storage devices of types different from that of the DRAM 204 or the flash memory 205 may be used. For example, the node device 1 may include a storage device such as a Content Addressable Memory (CAM), a Static Random Access Memory (SRAM), a Synchronous Dynamic Random Access Memory (SDRAM), etc.

Frame length management table T1, number-of-times-of-reception management table T2 and routing table T3 illustrated in FIG. 2 or other figures are implemented by the flash memory 205 or other storage device that are not illustrated. Also, the flash memory 205 stores the node ID of the node device 1 of the flash memory 205 etc. in addition to the operation program.

The PHY chip 202 is a circuit that conducts a process of the physical layer of wired connection. When the network 100 is a wireless network, the node device 1 does not have to include the PHY chip 202. However, the node device 1 may include the PHY chip 202 for connection with an external network.

For example, the node device 1 may include a wired LAN port based on a Ethernet (registered trademark) protocol so as to be connected to a GW device or the like of an external network via a cable connected to the wired LAN port.

In such a case, the MPU 201 can generate an Ethernet frame so as to output it to the PHY chip 202 via the MII/MDIO 209. Then, the PHY chip 202 converts outputs from the MPU 201 (i.e., a logical signal representing an Ethernet frame) into a signal in accordance with the type of a cable (i.e., an electric signal or an optical signal), and outputs it to the cable. Then, the node device 1 can transmit data to an external network by using the PHY chip 202.

The storage unit 20 can also convert an electric signal or an optical signal input from an external network via a cable and a wired LAN port into a logic signal and output it to the MPU 201 via the MII/MDIO 209. Thereby, the node device 1 can receive data (for example frames) from an external network by using the PHY chip 202.

The timer IC 203 performs a count-up operation until a set period of time elapses, and outputs an interrupt signal when the set time has elapsed.

The wireless communication module 206 is hardware that performs a process of the physical layer in wireless connection. The wireless communication module 206 includes for example an antenna, an Analog-to-Digital Converter (ADC), a Digital-to-Analog Converter (DAC), a modulator, a demodulator, an encoder, a decoder, etc.

In some embodiments, the hardware configuration of the node device 1 may be different from that illustrated in FIG. 15, and hardware other than the protocol/type exemplified in FIG. 15 may also be applied to the node device 1.

For example, the respective functional units in the control unit 30 illustrated in FIG. 2 may be implemented by using a hardware circuit. Specifically, these functional units of the control unit 30 illustrated in FIG. 2 may be implemented by a configurable circuit such as a Field Programmable Gate Array (FPGA) or by an Application Specific Integrated Circuit (ASIC) instead of the MPU 201. As a matter of course, these functional units may be implemented by both the MPU 201 and a hardware circuit.

Explanations have been given for embodiments above. However, the scope of the present embodiments is not limited to the above-described embodiments, and it is to be understood that the scope includes various modifications or substitutions of the above-described embodiments. For example, it is to be understood that the respective embodiments can be embodied by modifying a constituent without departing from the spirit or the scope of the embodiments. It is also to be understood that various embodiments can be implemented by arbitrarily combining a plurality of constituents that are disclosed in the above-described embodiments. Further, it is to be understood by those skilled in the art that various embodiments can be implemented by removing or replacing some constituents among all the constituents described in the above-described embodiments or by adding constituents to the constituents described in the above-described embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments) of the present invention have been described in detail, it should be understood that the various changes, substitutions, and alterations could be made hereto without departing from the spirit and scope of the invention.

What is claimed is:

1. A route selection method of a node device, the route selection method comprising:
   calculating by a processor a reception rate of frames of a particular frame type transmitted from an adjacent node device for which there is a link;
   calculating by the processor, on the basis of the calculated reception rate and a frame length of each frame type, an arrival rate, which is a rate at which the adjacent node device receives a data frame transmitted to the adjacent node device and the node device itself receives acknowledgement that the adjacent node device transmits to the node device itself when the data frame has been received;
   calculating by the processor an inverse number of the calculated arrival rate as a link cost of the link with the adjacent node device;
   obtaining by the processor from the adjacent node device a route cost, which is an integrated value of the link costs of the link in a route, for each route from the adjacent node device to each node device that is a reachable final destination;
   calculating by the processor a route cost of a route from the node device itself to each node device that is a final destination reachable via the adjacent node device by integrating the calculated link cost and the obtained route cost; and
   selecting by the processor an adjacent node device that is a transmission destination of a data frame as a transmission target on the basis of the route cost of a route from the node device itself to a node device that is a final destination of the data frame as a transmission target when the data frame is transmitted.

2. The route selection method of the node device according to claim 1, wherein
   the selecting selects the adjacent node device that is a transmission destination of the data frame as a transmission target so that the route cost of a route from the node device itself to a node device that is the final destination of the data frame as a transmission target is minimum.

3. The route selection method of the node device according to claim 2, wherein
   the calculating the reception rate calculates the reception rate on the basis of the number of times of receiving frames of the particular frame type from the adjacent node device and the number of times that the frames of the particular frame type transmitted from the adjacent node device were transmitted to the node device itself.

4. The route selection method of the node device according to claim 3, wherein
   the frame of the particular frame type is a hello frame.

5. The route selection method of the node device according to claim 2, wherein
   the frame of the particular frame type is a hello frame.

6. The route selection method of the node device according to claim 1, wherein
   the calculating the reception rate calculates the reception rate on the basis of the number of times of receiving frames of the particular frame type from the adjacent node device and the number of times that the frames of the particular frame type transmitted from the adjacent node device were transmitted to the node device itself.

7. The route selection method of the node device according to claim 6, wherein
   the frame of the particular frame type is a hello frame.

8. The route selection method of the node device according to claim 1, wherein
   the frame of the particular frame type is a hello frame.

9. A node device comprising:
   a processor configured to execute a process including:
   calculating a reception rate of frames of a particular frame type transmitted from an adjacent node device for which there is a link;
   calculating, on the basis of the calculated reception rate and a frame length of each frame type, an arrival rate, which is a rate at which the adjacent node device receives a data frame transmitted to the adjacent node device and the node device itself receives acknowledgement that the adjacent node device transmits to the node device itself when the data frame has been received;
   calculating an inverse number of the calculated arrival rate as a link cost of the link with the adjacent node device;
   obtaining from the adjacent node device a route cost, which is an integrated value of the link costs of the link in a route, for each route from the adjacent node device to each node device that is a reachable final destination;
   calculating a route cost of a route from the node device itself to each node device that is a final destination reachable via the adjacent node device by integrating the calculated link cost and the obtained route cost; and
   selecting an adjacent node device that is a transmission destination of a data frame as a transmission target on the basis of the route cost of a route from the node device itself to a node device that is a final destination of the data frame as a transmission target when the data frame is transmitted.

10. A relay system comprising:
    a plurality of node devices, wherein
    each of the node devices includes a processor that executes a process including:
    calculating a reception rate of frames of a particular frame type transmitted from an adjacent node device for which there is a link;
    calculating, on the basis of the calculated reception rate and a frame length of each frame type, an arrival rate, which is a rate at which the adjacent node device receives a data frame transmitted to the adjacent node device and the node device itself receives acknowledgement that the adjacent node device transmits to the node device itself when the data frame has been received;
    calculating an inverse number of the calculated arrival rate as a link cost of the link with the adjacent node device;
    obtaining from the adjacent node device a route cost, which is an integrated value of the link costs of the link in a route, for each route from the adjacent node device to each node device that is a reachable final destination;
    calculating a route cost of a route from the node device itself to each node device that is a final destination reachable via the adjacent node device by integrating the calculated link cost and the obtained route cost; and
    selecting an adjacent node device that is a transmission destination of a data frame as a transmission target on the basis of the route cost of a route from the node device itself to a node device that is a final destination of the data frame as a transmission target when the data frame is transmitted.

* * * * *